United States Patent Office 3,290,415
Patented Dec. 6, 1966

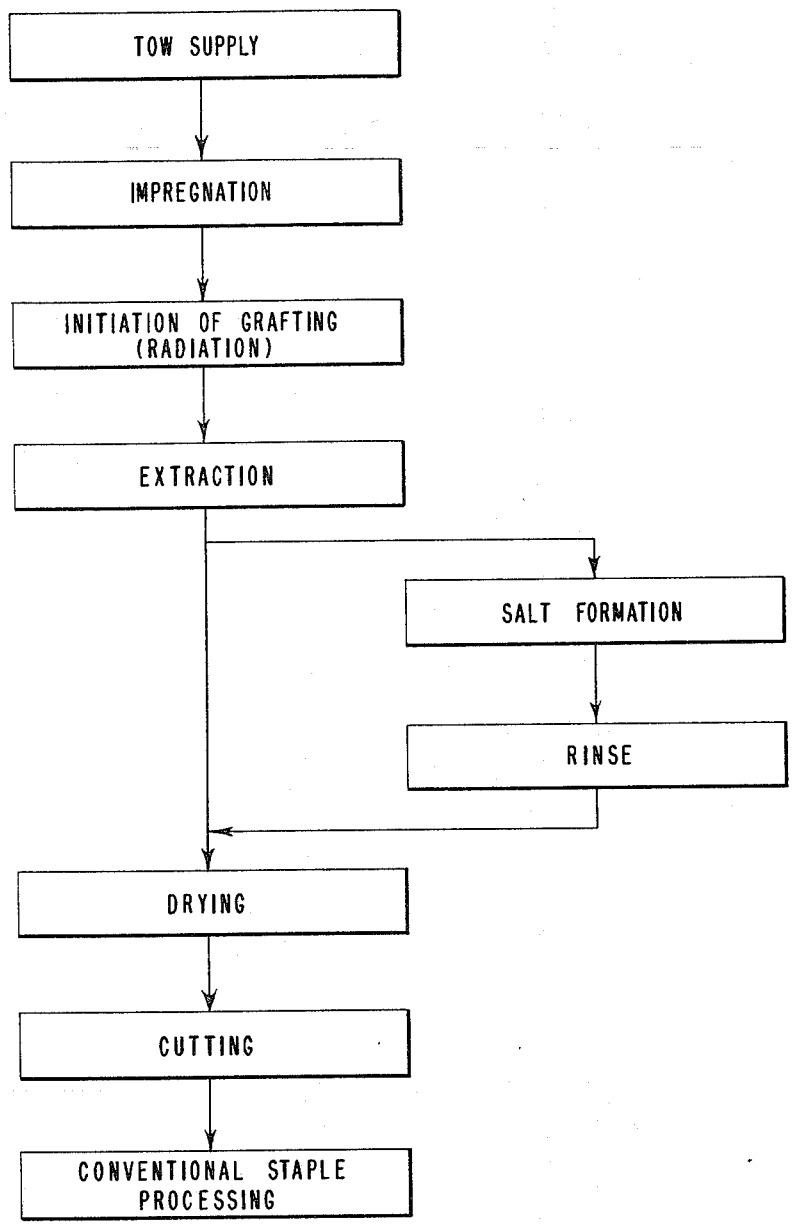

3,290,415
GRAFT COPOLYMER OF POLYMERIC HYDRO-
CARBON AND ORGANIC ACID BEARING
RADICAL
David Tanner, Wilmington, Del., assignor to E. I. du
Pont de Nemours and Company, Wilmington, Del., a
corporation of Delaware
Filed Mar. 26, 1959, Ser. No. 802,097
22 Claims. (Cl. 260—878)

This application is a continuation-in-part of U.S. Serial No. 613,984, filed October 4, 1956, now U.S. Patent No. 2,999,056, dated September 5, 1961.

This invention relates to product. More particularly it concerns a product obtained by chemically adhering an organic acid or its salt to a polymeric 1-olefin, thereby forming a graft copolymer.

OBJECTS

It is an object of the present invention to provide shaped articles of polymeric 1-olefin having new and desirable properties obtained by grafting an organic acid or its salt to said polymer. These new properties are obtained without substantial sacrifice of those properties inherent in articles produced from unmodified polymer. The modified polymer is thus known as a graft copolymer.

Another object is to provide a film or a textile formed from polyolefin which is freer from static, more dyeable, more resistant to soiling, is more resilient or crease resistant, more melt resistant, and more printable than product heretofore obtainable from the said polymer.

These and other objects will become apparent in the course of the following specification and claims.

STATEMENT OF INVENTION

In accordance with the present invention, a novel and useful graft copolymer is provided comprising (a) a polyhydrocarbon substrate derived from a 1-olefin and (b) grafted thereto, by carbon-carbon bonds, a plurality of acid groups, the said groups being derived from unsaturated organic acid. When the said unsaturated acid is not homopolymerizable, such as in the case of maleic acid, the grafted acid groups will be attached to the substrate polymer chain in groups approximately corresponding (in structure) to that of the original acid molecule. Preferably, however, homopolymerizable acids or copolymerizable monomer mixtures containing unsaturated acids are employed forming a graft copolymer wherein the acid groups are attached to the substrate polyolefin via polymeric side chains.

The preferred process for preparing the product of this invention is that disclosed and claimed in copending application United States Serial No. 613,984, filed October 4, 1956, of which the instant application is a continuation-in-part. In accordance with the process, a shaped article produced from a polyolefin, in intimate contact with an unsaturated organic acid or its preformed salt, is subjected to bombardment by ionizing radiation to produce chemical bonds between the shaped article and the organic compound. Preferably, the organic acid is applied to the surface of a shaped article, and is permitted to diffuse substantially or completely into and through the substrate, as desired, and the shaped article is thereafter irradiated with ionizing radiation to induce chemical bonding.

DEFINITIONS

By the term "polyhydrocarbon substrate derived from a 1-olefin" is meant a high molecular weight polymer (i.e., in the fiber and film forming range) obtained by polymerization of such 1-olefins as ethylene, propylene, butene, decene and the like. The term is also intended to included copolymers among these olefin components, as well as those copolymers in which a major proportion, preferably over 85%, is derived from the said 1-olefin monomers.

Linear, branched, isotactic, syndiatastic and atactic polymers are suitable, although the preferred polymers are those which are linear. High density, linear polyethylene is especially preferred, because of its strength as a textile. The polymers which are especially preferred are those which are fiber-forming.

By "graft copolymer" is meant a polymer which is modified, by chemically bonding thereto, molecules of a chemically dissimilar organic compound.

By "ionizing radiation" is meant radiation having sufficient energy to remove an electron from a gas atom, forming an ion pair. This requires an energy of about 32 electron volts (ev.) for each ion pair formed. This radiation has sufficient energy to non-selectively break chemical bonds; thus, in round numbers radiation with energy of about 50 electron volts (ev.) and above is effective for the process of this invention. The ionizing radiation of the process of this invention is generally classed in two groups: high energy particle radiation and ionizing electromagnetic radiation. The effect produced by these two types of radiation is similar, the essential requisite being that the incident particles or photons have sufficient energy to break chemical bonds and generate free radicals.

The preferred radiation for producing the product of this invention is high energy ionizing radiation, and has an energy equivalent to at least 0.1 million electron volts (mev.). Higher energies are even more effective; there is no known upper limit, except that imposed by available equipment.

DRAWING

The figure is a flow sheet illustrating a typical embodiment wherein the product of the present invention is prepared from a yarn or tow, which after impregnation with modifier is irradiated, then washed to remove ungrafted material. The product is thereafter converted to salt (unless the salt of the acid was used as modifier) rinsed and dried. The treated product may be used as continuous filament yarn, or alternatively, it may be cut to form staple fiber which is then spun to yarn and woven to textiles following conventional procedure.

EXPERIMENTAL PROCEDURES AND UNITS

Compositions are given in parts by weight or weight percent, unless otherwise noted.

The irradiation in many of the examples is carried out using a Van de Graaff electron accelerator with an accelerating potential of 2 million electron volts (mev.) with a tube current of 250 to 290 microamperes. Samples to be irradiated are placed on a conveyor and traversed back and forth under the electron beam at a distance of tube window to sample of 10 cm. The conveyor speed is 40 inches per minute. At the sample location the irradiation intensity is 12.5 watt sec./cm.$^2$ of sample which is approximately equivalent to an available dose per pass of one Mrad.

Radiation dosages are given in units of "Mrad" (millions of rads), a "rad" being the amount of high energy radiation of any type which results in an energy absorption of 100 ergs per gram of water or equivalent absorbing material. Alternatively, dosages may be indicated in terms of exposure in watt seconds per square centimeter of substrate treated.

The "standard washing" to which samples are subjected consists of a 30-minute immersion in 18 liters of 70° C. water contained in a 20-liter agitation washer. The wash solution contains 0.5% of detergent. The detergent employed is that sold under the trademark "Tide." This detergent contains, in addition to the active ingredient, well over 50% (sodium) phosphates (Chemical Industries, 60, 942, July 1947). Analysis shows the composition to be substantially as follows:

| | Percent |
|---|---|
| Sodium lauryl sulfate | 16 |
| Alkyl alcohol sulfate | 6 |
| Sodium polyphosphate | 30 |
| Sodium pyrophosphate | 17 |
| Sodium silicates and sodium sulfate | 31 |

The static propensity of the fabric is indicated in terms of direct current resistance in ohms per square, measured parallel to the fabric surface, at 78° F. in a 50% relative humidity atmosphere. High values, reported as the logarithm (to the base 10) of the resistivity (log $R$) indicate a tendency to acquire and retain a static charge. A meter suitable for this determination is described by Hayek and Chromey, American Dyestuff Reporter, 40, 225 (1951).

Wickability as measured in the examples is determined by placing a drop of water upon the fabric, and measuring the diameter of the wet spot after a standard time interval, e.g., 60 seconds. Alternatively, especially useful where decreased wickability is obtained, is a determination of the length of time required for a drop placed upon the fabric to disappear by soaking into the fabric. Discrepancies observed between control fabrics in the different examples are thought to be due to different preparation techniques. Data within each example are comparable.

Where quantitative values for hole melting are presented, they are measured by dropping heated glass beads of constant weight and diameter from a fixed height from a constant temperature oven onto the fabric or film. The temperature at which the structure is stained is called the first damage temperature, and the temperature at which the glass bead melts completely through the structure is referred to as the hole-melting temperature.

The fiber melt temperature reported in some examples is determined by placing a thread, unraveled from a fabric if necessary, upon an electrically heated tube and observing the tube temperature at which visible melting, fusing of filaments to the tube, or instantaneous decomposition occurs.

Crease recovery is evaluated by crumpling a fabric in the hand, and observing the rate at which it recovers from this treatment. Wet crease recovery indicates the rate and extent of disappearance of creases from the crumpled fabric which is wetted.

The following examples are cited to illustrate the invention. They are not intended to limit it in any manner.

*Example I*

Samples of polyethylene film, 1D, 1E, and 1F, are soaked in 25% aqueous acrylic acid and irradiated as shown in Table I. After rinsing in 80° C. distilled water for 1 hour, the samples are soaked in aqueous 2% $Na_2CO_3$ for 1 hour at 80° C., thus forming the sodium salt of the grafted acid. The samples are tested, with the results listed in Table I. Control samples 1A, 1B, and 1C, which are irradiated but receive no chemical treatments, are included for comparison.

TABLE I

| Sample | Acrylic Soak, Days | Radiation Dose, Mrad | $Na_2CO_3$ Treat. | Log R | Resist. to Hole Melting | Melt Temp., °C. |
|---|---|---|---|---|---|---|
| 1A | None | 2 | None | 13.1 | Poor | 215 |
| 1B | None | 5 | do | 13.1 | do | 215 |
| 1C | None | 20 | do | 13.1 | do | (¹) |
| 1D | 3 | 20 | Yes | 9.0 | Fair | 286 |
| 1E | 13 | 2 | do | 8.5 | do | 286 |
| 1F | 13 | 5 | do | 7.6 | do | (¹) |

¹ Not determined.

It can be seen that the irradiation alone does not appreciably increase the resistance to hole melting, but that the sodium-acrylate-grafted polyethylene is more resistant to hole melting, and has a significantly higher melt temperature.

*Example II*

A fabric prepared from polyethylene filaments is soaked for 30 minutes in a solution of 20% acrylic acid and 80% isooctane at 50° C. The fabric is irradiated with 2 mev. electrons at the soaking temperature to acquire a dose of 1 Mrad. It is then washed in hot distilled water at 80–90° C. four times, in a washing machine, to remove ungrafted material. The observed weight gain is 6.9%. The sample is converted to the sodium salt form of the grafted acrylic acid by boiling for 10 minutes in a 1% solution of sodium carbonate. After a standard wash and rinse in distilled water, the log $R$ of the dried fabric is 8.5; a reduced static propensity is noted, as well as improved wet crease recovery compared to control. The log $R$ of the fabric before grafting is greater than 13.3.

*Example III*

A 1.25 gram package of linear polyethylene fiber, drawn 10×, is coated with molten maleic anhydride. The anhydride solidifies on the fiber, when cooled to room temperature. The fiber sample is irradiated in air, using 2 mev. electrons to a total exposure of 26 Mrad. The yarn package is then washed in a large volume of water at 80° C. for two hours, and then in a dilute solution of "Tide" detergent for one hour. The dried sample exhibits a weight gain of 3.2%. When dyed with a basic dye, Victoria Blue (C.I. Basic Blue 26), it acquires a deep shade. The dye is fast to laundering in dilute aqueous "Tide" at 70° for one hour. A non-irradiated control is virtually undyeable and exhibits a weight gain, following the maleic anhydride treatment, of only 0.8%.

*Example IV*

A film of branched polyethylene, 5 mils thick, is coated with maleic anhydride as described in Example III. The film is irradiated with 2 mev. electrons to a total exposure of 18 Mrad. After extraction treatments similar to Example III, the film shows a weight gain of 2.34%. When dyed with Victoria Blue, an intense blue shade is obtained. A non-irradiated control exhibits a weight gain of 0.02%, and is not dyed by the basic dye.

*Example V*

A series of samples of polypropylene film (0.005" thick) are soaked in solutions of acrylic acid in cyclohexane of varying compositions, and are then irradiated as described above to a dose of 2 Mrad. Ungrafted homopolymer is extracted, and the weight gain of each sample is determined, with the results shown in Table II. Portions of each sample are used to determine zero strength temperature and the log R, with the results indicated. For comparison, the zero strength temperature (ZST) of an unmodified control, 5D, is 154° C., and has a log R of 13.7.

Portions of samples 5A to 5C are converted to the sodium salt form by boiling in 1% sodium phosphate solution, and the zero strength temperature and log R are determined. A third portion of each acid grafted sample is converted to the calcium salt form by boiling in 1% calcium chloride for ½ hour; a zero strength temperature and log R are determined as before, and are listed in Table II.

TABLE II

| Sample | Wt. Gain, Percent | Acid | | Sodium Salt | | Calcium Salt | |
|---|---|---|---|---|---|---|---|
| | | ZST | Log R | ZST | Log R | ZST | Log R |
| 5A | 26 | 212 | 13.0 | 217 | 8.0 | 224 | 12.9 |
| 5B | 20 | 254 | 13.0 | 229 | 7.8 | 235 | 12.3 |
| 5C | 18 | 221 | 12.6 | 265 | 8.1 | 222 | 12.4 |

*Example VI*

Polypropylene is extruded as a 34 filament yarn which is thereafter wound onto a package. The undrawn yarn is then metered by a feed roll to a more rapidly rotating draw roll; the draw ratio is 2×, and the yarn has a final denier of about 70. In the draw zone between the feed and draw rolls, the yarn contacts a glass roll wetted by dipping in a bath containing 100 grams of sodium styrene sulfonate, 600 grams of water, and 300 grams of ethanol. The drawn yarn is wound onto a bobbin, and while still wet with the solution containing the unsaturated acid, is rotated under the electron beam of a 2 mev. Van de Graaff for a period of 30 seconds. The dose is 1.2 Mrad. The yarn is boiled off for 30 minutes in distilled water, dried and analyzed for sulfur. The analysis shows 0.26% sodium styrene sulfonate grafted to the fiber. A skein of the yarn is dyed in a bath (100 grams of bath per gram of yarn) containing ½ gram per liter of Rhodamine B (C.I. Basic Vio. 10) for 1 hour at the boil. After scouring the yarn in detergent, it is observed to have a medium shade of red. When the experiment is repeated, except that the polypropylene fiber contacts a roll which dips in ethanol (no sodium styrene sulfonate), the dyed fiber shows only a faint shade of red.

The experiment is repeated, except that the yarn is drawn while exposed to the electron beam; the electrons impinge upon the yarn after it has contacted the roll dipping in the sodium styrene sulfonate solution, and before it is contacted with the draw roll. The yarn is drawn at 40 yards per minute; the radiation dose is 1.3 Mrad. Yarn treated in this manner acquires deep, brilliant shades using three different basic dyes, according to the preceding dyeing procedure. The dyes employed are Rhodamine B, Auramine (C.I. Basic Yell. 2) and methyl violet S (C.I. Basic Vio. 1). Control yarn treated in an exactly similar manner, except that no sodium styrene sulfonate is employed, is merely stained a light tint. The weight gain of the yarn due to grafted sodium styrene sulfonate is 2.52%.

In addition to improved dyeability, the product has improved antistatic properties, is more resistant to soiling, and has improved wickability over unmodified polypropylene filaments.

*Example VII*

Linear polyethylene flake (Melt Index 0.49) is cut ⅛ to 1/16″ flakes. Five grams of this finely ground flake is soaked in 60 milliliters of 10% acrylic acid in heptane, for a period of 2 to 3 hours. The sample, while still wet, is irradiated with 2 mev. electrons to a dose of 1 Mrad. The sample of flake is then washed in hot methanol followed by a wash in hot water (both at 80° C., for 1 hour). After drying, the weight gain is 0.5%. When the test is repeated, using 20% acrylic acid in heptane as a soaking solution, a weight gain of 3.3% is obtained.

SUBSTRATE SHAPE

Shaped articles may be made by extrusion, molding, casting and the like. The shape of the article to which the organic acid is adhered is not critical; it is preferred that it be a solid so that the location of the modifier may be readily controlled. Thus the process of the present invention may be applied to a solid substrate in any form such as a fiber, film, sponge, or pellicle. It may be in the form of a woven, knitted, or felted fabric, a paper, a bristle, artificial straw or a fibrid (the synthetic polymer analogue of beaten cellulose, described by Morgan in United States Patent No. 2,999,799, dated September 12, 1961. By the process of the present invention, organic modifiers may be grafted to addition polymer fibrids as a slurry, or as a paper-like material, to improve wickability, printability, water repellence, tear strength, adhesion and the like. Alternatively, the structure may be a flake, powder, or comminuted particle, which may be reshaped after grafting to form an article of specific end use. The shape is not a critical element in the treatment, except that shapes of increased thickness require a proportionately greater soaking time or high temperature or pressure when complete diffusion of the organic acid is desired. If limited penetration is desired, thickness of the shaped structure is not of importance in determining process details. It is merely necessary that radiation employed have enough penetration to activate the substrate at least to the maximum depth required to effect the desired grafting to the shaped polymer.

UNSATURATED ORGANIC ACIDS

By an "unsaturated organic acid" as used herein is meant any acid and/or anhydride which contains at least one reactive aliphatic unsaturated bond. It is preferred that it be of relatively low molecular weight since for most purposes it is desirable that the acid penetrate into the shaped article and low molecular weight acids more readily penetrate the polymer structures. Thus, acids with up to 8 carbon atoms are preferred. However, acids with as high as 20 carbons in chain length may be used. For maximum activation of the double bond, it is desirable that it be in close proximity to the carboxyl group, which also appears to enhance the rate of penetration of the agent into the fiber. Suitable unsaturated monoacids are acrylic, methacrylic, ethylacrylic, crotonic, propiolic, and styrene carboxylic acids, for example. To produce a slightly different effect, those unsaturated acids which are difunctional are highly useful. Examples of these are maleic, dichloromaleic, difluoromaleic, fumaric, butadiene dicarboxylic and itaconic acids. In addition to the acids, other derivatives such as acid chlorides, acid anhydrides, half acid esters, and half acid amides are also effective.

Any organic compound with aliphatic unsaturation, containing functional groups which are convertible to the acid form by hydrolysis (e.g., amides, esters, nitriles), oxidation (e.g., aldehydes or ketones), sulfonation or the like may be employed, although this increases the process steps and hence the cost of the product. The unsaturated acids may contain substituent groups which it may be desirable to attach to the polymer to confer other properties, such as enhanced static reduction, moisture repellence, dyeability, flame-proofness, etc. The said substituent groups may also be introduced by copolymerizing or cografting suitable monomers with unsaturated acid.

In addition to the unsaturated carboxylic acids, other acids are useful. Such acids are the sulfonic acids (e.g., styrene sulfonic acid, ethylene sulfonic acid), unsaturated alkyl or aralkyl acid phosphates, phosphites, phosphonates, and phosphinates; acid alkyl sulfates and carbonates with unsaturated carbon-carbon bonds also have utility. Substituted acid phosphinate derivatives have especial utility because they also improve oxidation resistance. It is sometimes convenient to graft the acids in the form of their preformed metal salts.

Mixtures of unsaturated acids as well as the penetration and grafting of one acid followed by the penetration and grafting of other acids are obvious technique modifications.

Due to the attachment of the unsaturated acid, the polymer becomes highly receptive to basic dyes. Cross sections of acid treated, grafter filaments dyed with basic dyes show deep dyeing throughout the fiber when the acid has penetrated into the fiber before grafting.

When experimental conditions are adjusted so that complete penetration does not occur, microscopic examination of the dyed filament cross section shows a sharply defined ring which clearly defines the depth of penetration. For some purposes limited penetration is desirable.

STRUCTURE OF GRAFT COPOLYMER PRODUCT

The product of this invention is a polymeric structure which has been termed a graft copolymer, that is, a polymer in which a modifying agent is grafted by chemical bonds, usually as a side chain, to the parent polymeric substrate.

Conventional copolymers, consisting of monomer species A and B, have a random distribution along the backbone of the polymer molecule, and may be represented schematically thus:

—AAABBABBBABAA—

The graft copolymer species with which one embodiment of this invention is concerned, consists of a main chain of polymer A, and side chains of polymer B grafted thereto, represented below:

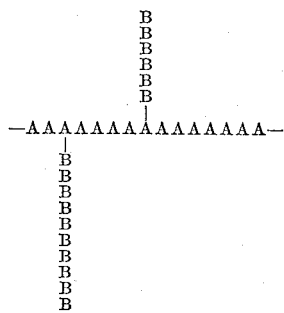

The characteristic of this copolymer type is that its gross properties remain predominantly those of the polymer (A) forming the molecular backbone. However, modifications can be produced via polymer (B) grafts, in most cases, without loss of the original desirable properties. As an example, conventional copolymers usually have a lower melting point than those of either component, while graft copolymers usually retain the high melting point of the pure backbone component. The structure and preparation of some examples of these copolymer types is discussed in a comprehensive review article by E. H. Immergut and H. Mark in Macromolekulare Chimie 18/19, 322–341 (1956). It is obvious, of course, that when the modifier B is not homopolymerizable (e.g., maleic acid), single B units will be grafted to the polymer substrate A.

APPLICATION OF MODIFIER

The organic acid may be applied to its shaped substrate by immersion, padding, calendering, spraying, exposure to vapor condensation, or by other similar means. It is sometimes desirable to remove excess liquid by squeezing prior to irradiation. Alternatively, the organic compound may be deposited upon the shaped substrate by flashing-off the solvent in which it is dissolved prior to application. When the polymer is penetrated with the modifier prior to initiating the graft polymerization, modification of the shaped structure extends at least through a substantial proportion of the body of the final product. Increased contact time and agitation are helpful in increasing penetration. It is sometimes beneficial to carry out the soaking for penetration at elevated temperatures, at superatmospheric pressure or in the presence of swelling agents, dye carriers, or the like. Concentrated aqueous solutions of acids which swell the polymer substrate are especially useful; for example, 50 to 60% acrylic acid is very effective with polyethylene. Minor amounts of wetting agents, surface active compounds, and the like are often useful for improving penetration efficiency.

When it is desirable to limit penetration of the organic acid to a zone near the substrate surface, this may be accomplished by reduced contact time or temperature, or use of modifiers with greater chain length. Alternatively, the shaped substrate may be exposed to the modifier for the time required to effect the desired penetration, then penetration may be stopped by freezing, for example, with Dry Ice. The combination may then be irradiated while frozen, and grafting will occur when the combination is warmed.

Where the modifier is applied from a solution, water is usually the preferred solvent, due to its low cost. Other liquids are suitable for this purpose, however, and often decrease the soaking time required for complete penetration, due to their swelling ability. Suitable liquids are alcohol, benzene, toluene, hexane, heptane, high boiling ethers and the like; where high soaking or irradiation temperatures are used, a non-volatile solvent is often advantageous.

RADIATION WHICH IS EFFECTIVE

The ionizing radiation preferred for making the product of this invention must have at least sufficient energy to non-selectively break chemical bonds. The preferred ionizing radiation has sufficient energy so that appreciable substrate thickness is penetrated, and, in addition, radiation absorption by the atmosphere is sufficiently low so that it is unnecessary to operate in a vacuum. Such radiation has energy of at least about 0.1 mev. Higher energies are even more effective; the only known upper limit is imposed by available equipment.

The ionizing radiation of the process of this invention is generally considered in two classes: Particle radiation, and electromagnetic radiation. Effects produced by these two types of radiation are similar, since in their interaction with matter, each generates secondary radiation of the other type. The high energy particle radiation is an emission of highly accelerated electrons or nuclear particles such as protons, neutrons, alpha particles, deutrons, beta particles, or the like, directed so that the said particle impinges upon the polymer bearing the organic compound. The charged particles may be accelerated to high speeds by means of a suitable voltage gradient, preferably at least 0.1 mev., using such devices as a resonant cavity accelerator, a Van de Graff generator, a betatron, a synchrotron, cyclotron, or the like, as is well known to those skilled in the art. Neutron radiation may be produced by bombardment of selected light metal (e.g., beryllium) targets with high energy positive particles. In addition, particle radiation may be obtained from an atomic pile or from radioactive isotopes or from natural or artificial radioactive materials.

Similarly, ionizing electromagnetic radiation is produced when a metal target (e.g., gold or tungsten) is bombarded by electrons possessing appropriate energy. Such energy is imparted to electrons by accelerating potentials in excess of 0.1 million electron volts (mev.). Such radiation, conventionally termed X-ray, will have a short wave length limit of about 0.01 Angstrom units (in the case of 1 mev.) and a spectral distribution of energy at longer wave lengths determined by the target material and the applied voltage. X-rays of wave lengths longer than 1 or 2 Angstrom units are attenuated in air thereby placing a practical long wave length limit on the radiation. In addition to X-rays produced as indicated above, ionizing electromagnetic radiation suitable for carrying out the process of the invention may be obtained from a nuclear reactor ("pile") or from natural or artificial radioactive material, for example, cobalt 60. In all of these latter cases, the radiation is conventionally termed gamma-rays. While gamma radiation is distinguished from X-radiation only with reference to its origin, it may be noted that the spectral distribution of X-rays is different from that of gamma-rays, the latter frequently being essentially monochromatic, which is never the case with X-rays produced by electron bombardment of a target.

RADIATION ENERGY

To be efficient in the practice of the present invention, it is necessary that the high energy particles have sufficient velocities to permit penetration of several layers of material, when fabrics or films are being treated. Although an energy of about 50 ev. is enough to initiate the grafting reaction, energies of at least 0.1 mev. are preferred, for efficient penetration. The velocity required will depend on the nature of the particle and also on the nature of the substrate to a certain extent. Thus, 2 mev. electrons will effectively penetrate 0.7 gm./cm.$^2$ of any shaped article, while 1 mev. electrons are effective for 0.35 gm./cm.$^2$.

As stated previously, there is no known upper limit to the particle energy, except that imposed by present day equipment. Thus, energies equivalent to 24 mev. to 100 mev. may be used.

RADIATION DOSE

In determining the optimum dose of irradiation for any particular combination, both the nature of the organic acid and the nature of the solid substrate must be considered. The extent of irradiation-induced graft polymerization can be increased by increasing either radiation dose, post-irradiation time, post-irradiation temperature, or all three. For instance, if a polymer soaked in acrylic acid solution is irradiated with a dose of 0.06 Mrad, and the irradiated sample is kept in contact with the acrylic acid solution for 1 hour at room temperature, a large amount of the acid is grafted. In contrast, with the same dose, if monomer is removed from the sample immediately after irradiation (e.g., by a water extraction), only one-third as much acrylic acid is grafted. Therefore, for homopolymerizable acids and readily graftable polymer substrates, a very small dose is required; thus, a minimum dose of 5000 rads (0.005 Mrad) initiates a significant amount of grafting.

When unsaturated compounds which are not homopolymerizable (e.g., maleic acid) are used as the modifier, in combination with readily graftable substrates, doses of 0.1 Mrad are required to initiate appreciable grafting. Radiation doses below the minimum specified fail to initiate beneficial amounts of grafting within a practical length of time. This is due to the fact that the life of free radicals produced by the irradiation depends on a balance between competing (i.e., non-grafting) reactions and those which produce grafting. It is obvious, of course, that even lower doses may be used in completely inhibitor- and oxygen-free systems, or if irradiation-initiation of grafting is supplemented by a chemical initiator.

Although the minimum doses specified are effective, higher dosages may be used and are usually highly beneficial. Dosages so high that substantial degradation of the shaped substrate occurs must obviously be avoided. High doses cross-link some polymers, which may sometimes be undesirable. In general, fibers produced from polyethylene may be irradiated to a dosage as high as 100 Mrad. However, it is preferred that the dosage applied to these substrates not exceed about 50 Mrad.

Some improvement in substrate properties (such as antistatic effect) is obtained when as little as 0.25% acid is grafted to the substrate, especially when the graft is primarily on the substrate surface. However, it is generally desirable to graft at least 1% and preferably at least 2% of the unsaturated acid to the polyhydrocarbon substrate.

REACTION CONDITIONS

Once free radicals are produced on the carbon atoms of the polymer chain in the presence of the unsaturated acid, vinyl polymerization is initiated, and polyvinyl chains grow from the initiating sites. However, it has been observed that the life of free radicals is many times greater than has been found in vinyl polymerizations carried out in solution or emulsions. For this reason, at a given radiation dose, the yield of polymer grafted to the shaped substrate is much greater than would be obtained, for example, if the substrate polymer were dissolved in the vinyl monomer and the solution irradiated.

The average molecular weight of the grafted polymer chains (at a given constant weight gain) may be controlled by adjusting the radiation dose. It may also be adjusted by controlling chain transfer to the substrate polymer, e.g., by changing grafting temperatures, or modifying the substrate polymer by incorporating copolymer components which are more (or less) susceptible to chain transfer. Similarly, the molecular weight distribution of the grafted polymer chains may be adjusted. By controlling the number, length and length distribution of grafted chains, the effect produced by a given grafting agent may be modified. In comparison with polyethylene prior to grafting, the polyethylene with grafted acrylic acid chains has a decreased melt index, although the melt viscosity remains low enough so that the polymer is melt extrudable. The density and branching index are increased, as well as the swellability.

SALT FORMATION

The examples have shown a process whereby an unsaturated organic acid or its preformed salt is grafted to a polyhydrocarbon substrate. When the acid is used, the product formed may be converted to a salt by contacting with an appropriate solution containing positive ions. The acid-grafted polymer substrate is characterized by deep dyeability with basic dyes; the product in the form of a salt in some cases has greatly increased resistance to hole melting; with other cations (e.g., sodium), the acid-grafted substrate is highly anti-static, hydrophilic, soil repellant, and is readily dyeable.

Any salt can be formed on the acid-grafted polymer by simple treatment in aqueous solution, as already described. Calcium ion is very readily picked up by the acid-modified polymer. If two or more cations are present in the treating solution, one ion will usually be picked up in preference to the other. For example, when both sodium and calcium ion are present, calcium acrylate will be formed in preference to sodium. This is readily controlled by treating the acid-modified polymer with a solution in which calcium ion sequestrant (e.g., sodium hexametaphosphate) is included. Under those conditions of treatment, sodium ion is picked up in preference to the calcium ion. When lithium ion is substituted as the cation for sodium, then similar hydrophilic and heat resistant properties are obtained. It may at times be desirable to treat the acid-modified polymer simultaneously or consecutively with more than one species of ion to obtain multiple effects. For example, since calcium ion is very effective in improving heat resistance, after incorporating this ion throughout the body of a shaped structure, sodium ions may be attached at or near the surface (using calcium sequestrant and sodium ion) to improve the antistatic characteristics.

Among metallic salts suitable for use in the process of the present invention may be mentioned sodium carbonate, potassium carbonate, potassium acetate, calcium acetate, manganous acetate, zinc acetate, cupric acetate, cobaltous acetate, chromic acetate, lanthanum acetate and the like. Phosphate containing detergents such as "Tide" and even some hard waters are suitable as cation donors.

The replacement of one positive ion by another on the acid-modified polymer of this invention follows the usual mechanisms of ion-exchange resins; similar concentration effects are observed. This subject is treated in detail by O. H. Osborn in "Synthetic Ion Exchangers" (Macmillan Publishing Co., 1956). If desired, ion exchange may be repressed or prevented by treating the acid-grafted polymer with a complex ion, or in some cases, producing a coordination compound after treatment. Ion-exchange capacity is enhanced by grafting larger amounts of the acid, for example, by repeating the soaking in acid plus irradiation. Loadings of 100 to 200% are beneficial.

When the acid-grafted polymer is treated with positive ions, especially sodium, physical changes are produced which remain, for example, after regeneration of the acid form. The effect of these changes is to produce a more open structure, which is much more permeable to dispersed dyes and other treating agents. These structure changes permit preparation of fabrics having a high degree of crease retention, wet crease recovery and freedom from soil; stretch yarns with good crimp retention may be made. The waxy hand characteristic of polyethylene filaments, which makes them unacceptable for apparel uses, is significantly decreased via the graft of the salt of the unsaturated acid.

In addition to the above, the salt of the acid-grafted product of this invention is readily dyeable to deep shades, not only with basic dyes, but surprisingly, with disperse, acid, vat and direct dyes. In general, only light shades are obtainable with acid, vat and direct dyes on unmodified polyhydrocarbon. Improved leveling and more rapid dying (due to the open structure) are also attained.

Organic cations are suitable for forming the salt of the acid-modified polyhydrocarbon. Any amine or quaternary ammonium compound may be employed. Among these may be mentioned ammonia, aliphatic, aromatic, cycloaliphatic and hereterocyclic amines such as ethylamine, diethylamine, triethylamine, triethanolamine, guanidine, aniline, benzylamine, cyclohexylamine, piperidine, morpholine, and the like. Also the nature of the quaternary ammonium ion used in salt formation is not critical. Methyl-pyridinium chloride, trimethylbenzylammonium chloride, tetramethyl ammonium chloride and the like may be used. Polyquaternary compounds are also useful, especially those having sufficiently low molecular weight to obtain penetration.

Many equivalent modifications will be apparent to those skilled in the art from a reading of the above with a departure from the inventive concept.

What is claimed is:

1. A graft copolymer consisting essentially of (a) a polymeric hydrocarbon substrate derived by addition polymerization of aliphatic mono-olefin and (b) grafted thereto by a carbon-to-carbon linkage, a plurality of side chains of monomeric units having groups from the class consisting of acid groups and acid anhydride groups, the said side chain comprising from about 0.26% to about 200% by weight of the said copolymer and being derived by free radical mechanism from an organic compound having (1) aliphatic carbon-to-carbon unsaturated and (2) a radical from the class consisting of an acid radical and an acid anhydride radical.

2. The graft copolymer of claim 1 wherein the said acid groups of the said side chains are in the form of a salt.
3. The graft copolymer of claim 1 wherein the said acid groups are carboxylic.
4. The polymer of claim 1 wherein the said polymeric-hydrocarbon substrate is polyethylene.
5. The polymer of claim 1 wherein the said polymeric-hydrocarbon substrate is polypropylene.
6. The graft copolymer of claim 1 in which the grafted acid groups are attached to grafted polymer chains, the said chains being derived from unsaturated organic acid.
7. The graft copolymer of claim 6 wherein the said unsaturated organic acid is acrylic acid.
8. The graft copolymer of claim 6 wherein the said unsaturated organic acid is styrene sulfonic acid.
9. The polymer of claim 2 wherein the said polymeric-hydrocarbon substrate is polyethylene.
10. The polymer of claim 2 wherein the said polymeric-hydrocarbon substrate is polypropylene.
11. The graft copolymer of claim 2 in which the grafted acid groups are attached to grafted polymer chains, the said chains being derived from unsaturated organic acid.
12. The graft copolymer of claim 11 wherein the said unsaturated organic acid is acrylic acid.
13. The graft copolymer of claim 11 wherein the said unsaturated organic acid is styrene sulfonic acid.
14. The polymer of claim 2 wherein the salt is the sodium salt.
15. The polymer of claim 2 wherein the salt is the calcium salt.
16. A filament of the polymer of claim 1.
17. A filament of the polymer of claim 2.
18. A film of the polymer of claim 1.
19. A film of the polymer of claim 2.
20. A fabric produced from the structure of claim 16.
21. A fabric produced from the structure of claim 17.
22. The polymer of claim 9 wherein the said polyethylene is linear.

References Cited by the Examiner

UNITED STATES PATENTS

| | | | |
|---|---|---|---|
| 2,227,777 | 1/1941 | Farmer et al. | 260—4 |
| 2,405,817 | 8/1946 | D'Alelio | 260—878 |
| 2,609,353 | 9/1952 | Rubens et al. | 260—878 |
| 2,837,496 | 6/1958 | Vandenberg | 260—878 |
| 2,863,812 | 12/1958 | Graham | 260—878 |
| 2,947,718 | 8/1960 | Rugg et al. | 260—878 |
| 2,955,953 | 10/1960 | Graham | 204—154 |

FOREIGN PATENTS

| | | |
|---|---|---|
| 499,577 | 1/1954 | Canada. |
| 1,154,139 | 10/1957 | France. |
| 1,161,824 | 3/1958 | France. |
| 1,172,920 | 10/1958 | France. |
| 1,175,843 | 11/1958 | France. |
| 202,353 | 3/1959 | Austria. |

OTHER REFERENCES

Immergut et al., "Die Makromolekulare Chemie," 18/19, 322, pages 326 and 328 relied upon (March 1956).

Hardwood et al., "The Effect of Radiation on Materials," pages 287 (1958), Reinhold New York.

Nomenclature Report, Journ. Polymer Science, 8, 257, page 260 relied upon (1952).

MURRAY TILLMAN, *Primary Examiner.*

DANIEL ARNOLD, LEON J. BERCOWITZ, *Examiners.*

D. E. PELHAM, N. W. SHUST, W. L. BASCOMB, D. J. BREZNER, *Assistant Examiners.*